United States Patent
Lai

(10) Patent No.: US 8,363,335 B1
(45) Date of Patent: Jan. 29, 2013

(54) OPTICAL LENS SYSTEM

(75) Inventor: Shu Tzu Lai, Taichung (TW)

(73) Assignee: Newmax Technology Co., Ltd., Taichung (TW)

( * ) Notice: Subject to any disclaimer, the term of this patent is extended or adjusted under 35 U.S.C. 154(b) by 62 days.

(21) Appl. No.: 13/196,467

(22) Filed: Aug. 2, 2011

(51) Int. Cl.
*G02B 3/02* (2006.01)
*G02B 13/18* (2006.01)

(52) U.S. Cl. ........................................ 359/716; 359/708

(58) Field of Classification Search .................. 359/642, 359/708, 716
See application file for complete search history.

(56) References Cited

U.S. PATENT DOCUMENTS

2007/0242369 A1* 10/2007 Huang et al. .................. 359/716

* cited by examiner

Primary Examiner — James Greece

(57) ABSTRACT

An optical lens system comprises, in order from the object side to the image side: a first lens element with a positive refractive power having a convex object-side surface, one of the object-side surface and an image-side surface being aspheric; a stop; a second lens element with a negative refractive power having a concave object-side surface, one of the object-side surface and an image-side surface being aspheric; a third lens element with a positive refractive power having a concave image-side surface, one of an object-side surface and the image-side surface being aspheric. Focal lengths of the first, second and third lens elements are f1, f2, f3, respectively, they satisfy the relations: $0.4<|f1|/|f2|<1.0$; $0.5<|f2|/|f3|<1.3$. If $|f1|/|f2|$ and $|f2|/|f3|$ satisfy the above relations, it can provide a wide field of view and improve the resolution. Contrarily, the performance and resolution of the optical lens system will be reduced.

7 Claims, 5 Drawing Sheets

OPTICAL LENS SYSTEM

BACKGROUND OF THE INVENTION

1. Field of the Invention

The present invention relates to an optical lens system, and more particularly to a three-piece optical lens system.

2. Description of the Prior Art

In recent years, with the popularity of the mobile phone cameras, the optical lens system has become smaller in size, and the electronic sensor of a general digital camera is typically a CCD (Charge Coupled Device) or CMOS (Complementary Metal Oxide Semiconductor) sensor. Due to advances in semiconductor manufacturing, the pixel size of sensor has been reduced continuously, and miniaturized optical lens systems have increasingly higher resolution. Therefore, there's an increasing demand for an imaging lens system with better image quality.

Conventional miniaturized lens systems mostly consist of three lens elements as shown in FIG. 3, from the object side to the image side: a first lens element 91 with positive refractive power, a second lens element 92 with negative refractive power and a third lens element 93 with positive refractive power. Such arrangements are favorable to correct various aberrations, however, the second lens element 92 is negative and the refractive power of the third lens element 93 is not big, such that the refractive power of the first lens element 91 must be big enough to provide the refractive power of the optical lens system, which will increase the sensitivity of the optical lens system and reduce the yield rate.

Therefore, the present invention is aimed at providing an optical lens system which can improve the yield rate and provide great image quality.

The present invention mitigates and/or obviates the aforementioned disadvantages.

SUMMARY OF THE INVENTION

The primary objective of the present invention is to provide an optical lens system capable of effectively providing a good image quality and improving the yield rate.

An optical lens system in accordance with the present invention comprises, in order from the object side to the image side: a first lens element with a positive refractive power having a convex object-side surface, at least one of the object-side and an image-side surfaces of the first lens element being aspheric; a stop; a second lens element with a negative refractive power having a concave object-side surface, at least one of the object-side and an image-side surfaces of the second lens element being aspheric; a third lens element with a positive refractive power having a concave image-side surface, at least one of an object-side and the image-side surfaces of the third lens element being aspheric. In the optical lens system, the focal length of the first lens element is f1, the focal length of the second lens element is f2, the focal length of the third lens element is f3, and they satisfy the relations: $0.4 < |f1|/|f2| < 1.0$; $0.5 < |f2|/|f3| < 1.3$.

If $|f1|/|f2|$ and $|f2|/|f3|$ satisfy the above relations: a wide field of view can be provided and the resolution can be improved evidently. Contrarily, $|f1|/|f2|$ and $|f2|/|f3|$ exceed the above ranges, the performance and resolution of the optical lens system with a wide field of view will be reduced, and the yield rate will be low.

According to one aspect of the present optical lens system, the focal length of the optical lens system is f, the focal length of the first lens element and the second lens element combined is f12, and they satisfy the relation: $1.3 < |f12|/|f| < 2.5$. If $|f12|/|f|$ satisfies the above relation, a wide field of view can be provided and the resolution can be improved evidently. Contrarily, If $|f12|/|f|$ exceeds the above range, the performance and resolution of the optical lens system with a wide field of view will be reduced, and the yield rate will be low.

According to another aspect of the present optical lens system, the focal length of the optical lens system is f, the focal length of the second lens element and the third lens element combined is f23, and they satisfy the relation: $25 < |f23|/|f| < 70$. If $|f23|/|f|$ satisfies the above relation, a wide field of view can be provided and the resolution can be improved evidently. Contrarily, If $|f23|/|f|$ exceeds the above range, the performance and resolution of the optical lens system with a wide field of view will be reduced, and the yield rate will be low.

According to another aspect of the present optical lens system, the focal length of the optical lens system is f, the distance between the object-side surface of the first lens element and the image plane is TL, and they satisfy the relation: $0.6 < |f|/|TL| < 1.0$. If $|f|/|TL|$ satisfies the above relation, a wide field of view can be provided and the resolution can be improved evidently. Contrarily, If $|f|/|TL|$ exceeds the above range, the performance and resolution of the optical lens system with a wide field of view will be reduced, and the yield rate will be low.

The present invention will be presented in further details from the following descriptions with the accompanying drawings, which show, for purpose of illustrations only, the preferred embodiments in accordance with the present invention.

DETAILED DESCRIPTION OF THE PREFERRED EMBODIMENTS

Figure 1A:
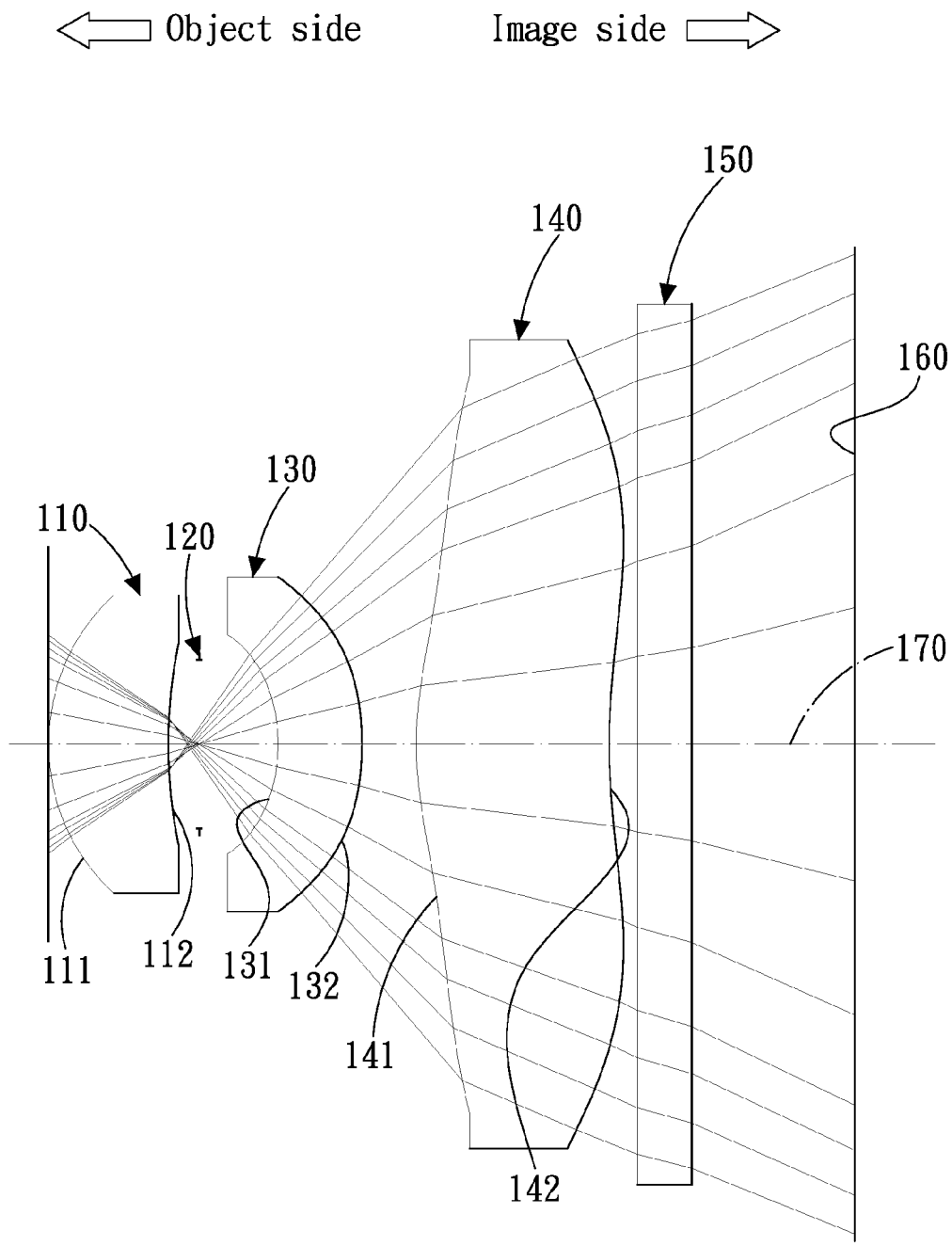
FIG. 1A shows an optical lens system in accordance with a first embodiment of the present invention.
Figure 1B:
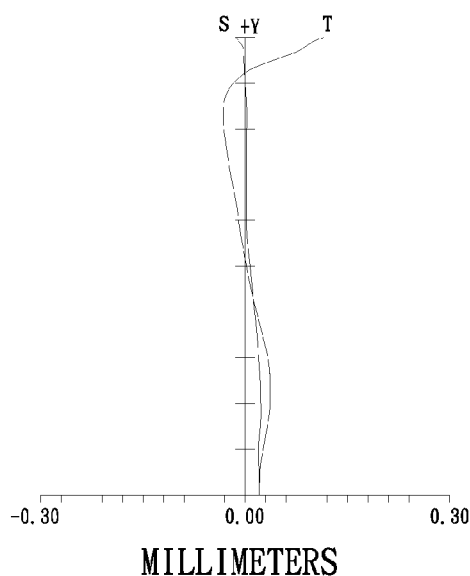
FIG. 1B shows the longitudinal spherical aberration curve, the astigmatic field curve, and the distortion curve of the first embodiment of the present invention.
Figure 1B:
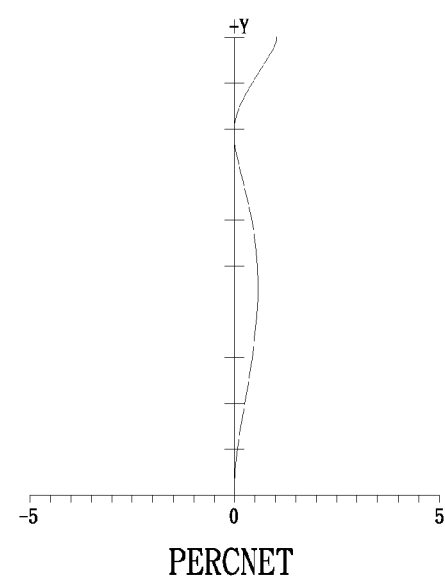
Figure 1B:
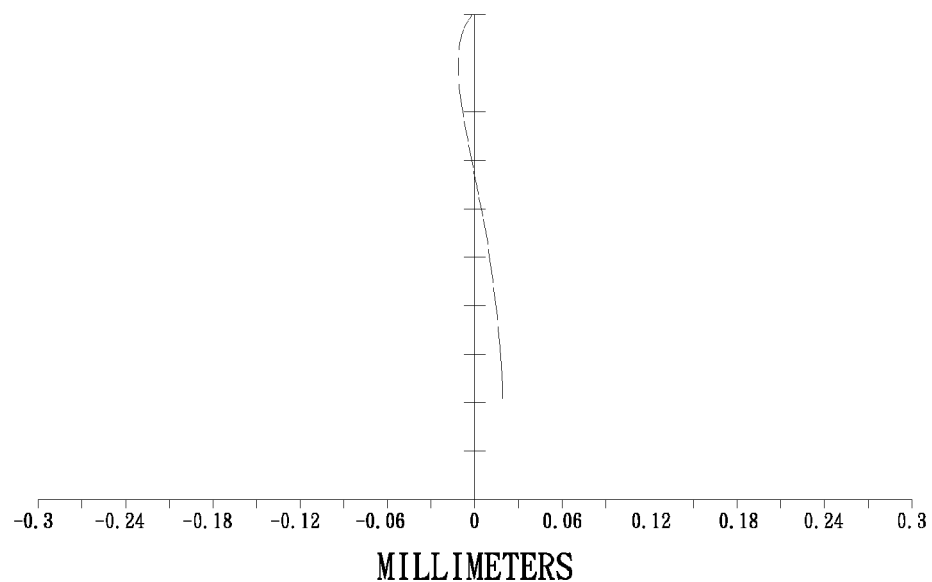

Referring to FIG. 1A, which shows an optical lens system in accordance with a first embodiment of the present invention, and FIG. 1B shows the longitudinal spherical aberration curves, the astigmatic field curves, and the distortion curve of the first embodiment of the present invention. An optical lens system in accordance with the first embodiment of the present invention comprises, in order from the object side A to the image side B:

A first lens element 110 with a positive refractive power made of plastic has a convex object-side surface 111 and a concave image-side surface 112, and the object-side surface 111 and the image-side surface 112 of the first lens element 110 are aspheric.

A stop 120.

A second lens element 130 with a negative refractive power made of plastic has a concave object-side surface 131 and a convex image-side surface 132, and the object-side surface 131 and the image-side surface 132 of the second lens element 130 are aspheric.

A third lens element 140 with a positive refractive power made of plastic has a convex object-side surface 141 and a concave image-side surface 142, and the object-side surface 141 and the image-side surface 142 of the third lens element 140 are aspheric.

An IR cut filter 150 made of glass is located between the image-side surface 142 of the third lens element 140 and an image plane 160 and has no influence on the focal length of the optical lens system.

The equation for the aspheric surface profiles of the first embodiment is expressed as follows:

$$z = \frac{ch^2}{1 + [1 + (k+1)c^2h^2]^{0.5}} + Ah^4 + Bh^6 + Ch^8 + Dh^{10} + Eh^{12} + Gh^{14} + \ldots$$

wherein:

z represents the value of a reference position with respect to a vertex of the surface of a lens and a position with a height h along the optical axis 170 k represents the conic constant;

c represents the reciprocal of the radius of curvature;

A, B, C, D, E, G, . . . : represent the high-order aspheric coefficients,

In the first embodiment of the present optical lens system, the focal length of the optical lens system is f, and it satisfies the relation:

$f=2.5$.

In the first embodiment of the present optical lens system, the f-number of the optical lens system is Fno, and it satisfies the relation:

$Fno=2.8$.

In the first embodiment of the present optical lens system, the field of view of the optical lens system is 2ω, and it satisfies the relation:

$2\omega=71$:

In the first embodiment of the present optical lens system, the focal length of the first lens element 110 is f1, the focal length of the second lens element 130 is f2, and they satisfy the relation:

$|f1|/|f2|=0.698$.

In the first embodiment of the present optical lens system, the focal length of the second lens element 130 is f2, the focal length of the third lens element 140 is f3, and they satisfy the relation:

$|f2|/|f3|=0.904$.

In the first embodiment of the present optical lens system, the focal length of the optical lens system is f, the focal length of the first lens element 110 and the second lens element 130 combined is f12, and they satisfy the relation:

$|f12|/|f|=1.903$.

In the first embodiment of the present optical lens system, the focal length of the optical lens system is f, the focal length of the second lens element 130 and the third lens element 140 combined is f23, and they satisfy the relation:

$|f23|/|f|=39.871$.

In the first embodiment of the present optical lens system, the focal length of the optical lens system is f, the distance between the object-side surface 111 of the first lens element 110 and the image plane 160 is TL, and they satisfy the relation:

$|f|/|TL|=0.801$.

The detailed optical data of the first embodiment is shown in table 1, and the aspheric surface data is shown in table 2, wherein the units of the radius of curvature, the thickness and the focal length are expressed in mm. In the tables 1 and 2, the surfaces 1 and 2 represent the object-side surface 111 and the image-side surface 112 of the first lens element 110, respectively, the surfaces 4 and 5 represent the object-side surface 131 and the image-side surface 132 of the second lens element 130, respectively, and the surfaces 6 and 7 represent the object-side surface 141 and the image-side surface 142 of the third lens element 140, respectively.

TABLE 1

(Embodiment 1)
f (focal length) = 2.5 mm, Fno = 2.8, 2ω = 71:

| Surface # |           | Curvature Radius | Thickness | Material | nd     | vd        |
|-----------|-----------|------------------|-----------|----------|--------|-----------|
| 0         | Object    | Infinity         | Infinity  |          |        |           |
| 1         | Lens 1    | 0.810569 (ASP)   | 0.464811  | Plastic  | 1.535  | 56        |
| 2         |           | 2.014131 (ASP)   | 0.119456  |          |        |           |
| 3         | Stop      | Infinity         | 0.306195  |          |        |           |
| 4         | Lens 2    | −0.662 (ASP)     | 0.324965  | Plastic  | 1.632  | 23        |
| 5         |           | −1.16917 (ASP)   | 0.20916   |          |        |           |
| 6         | Lens 3    | 1.193874 (ASP)   | 0.749598  | Plastic  | 1.535  | 56        |
| 7         |           | 2.521003 (ASP)   | 0.11      |          |        |           |
| 8         | IR-filter | Infinity         | 0.21      | Glass    | 1.5168 | 64.167336 |
| 9         |           | Infinity         | 0.631495  |          |        |           |
| 10        | Image     | Infinity         |           |          |        |           |

TABLE 2

Aspheric Coefficients

| Surface # | 1        | 2        | 4        | 5        | 6         | 7        |
|-----------|----------|----------|----------|----------|-----------|----------|
| k =       | −0.03884 | 4.049545 | 1.22589  | 1.744959 | −14.74451 | 1.315892 |
| A =       | 0.044644 | −0.06381 | 0.025826 | −1.03006 | −0.18065  | −0.23157 |
| B =       | 0.511206 | 0.527859 | 0.204989 | 3.034897 | 0.175589  | 0.07323  |
| C =       | −2.70739 | −2.6657  | 45.96038 | −7.72808 | −0.0725   | −0.03231 |

TABLE 2-continued

| Aspheric Coefficients | | | | | | |
|---|---|---|---|---|---|---|
| Surface # | 1 | 2 | 4 | 5 | 6 | 7 |
| D = | 9.15671 | −50.3156 | −465.378 | 9.470822 | 0.012455 | 0.01257 |
| E = | −11.6546 | 342.1318 | 1519.958 | 1.521 | 0.000329 | −0.00242 |

Figure 2A:
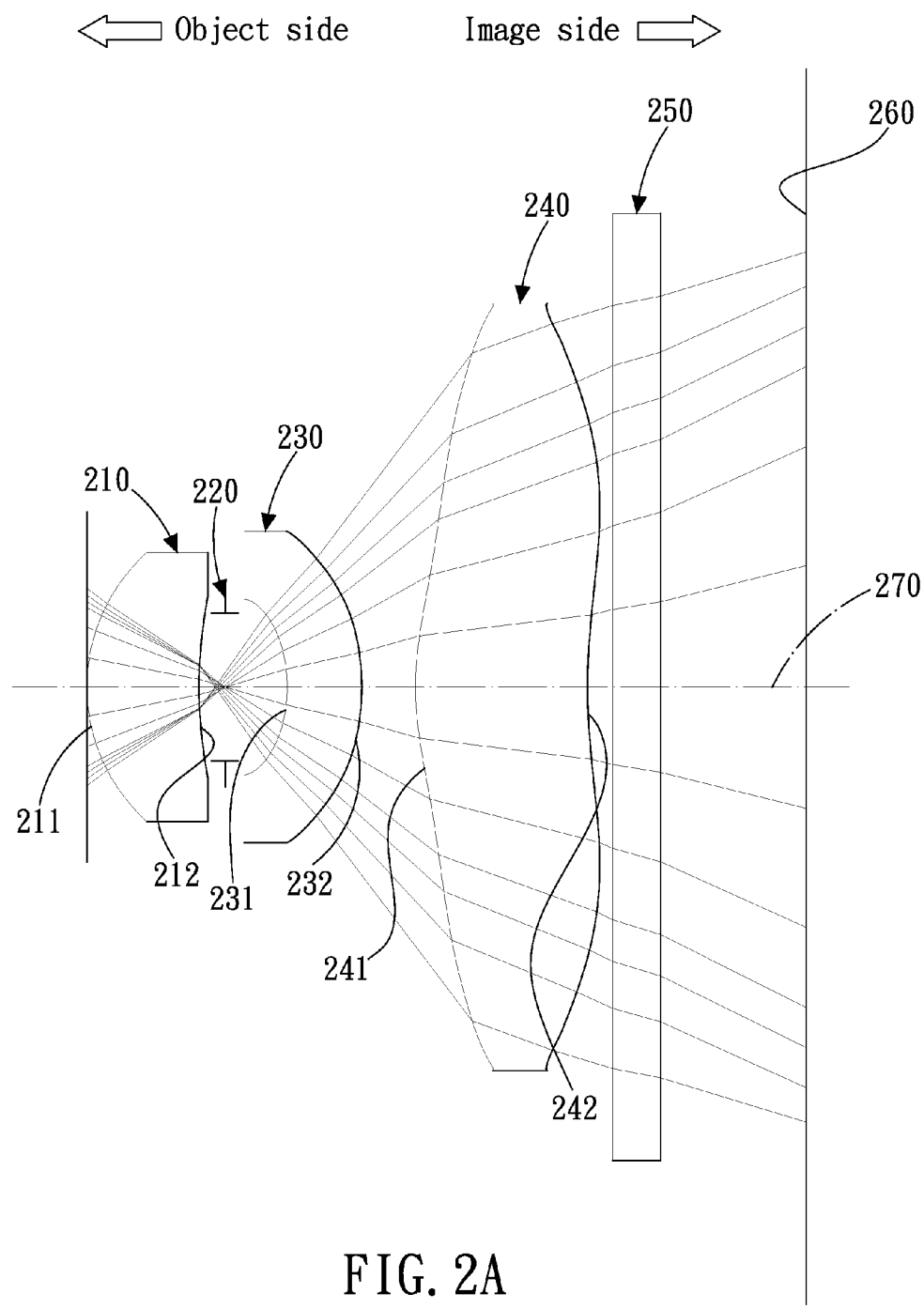
FIG. 2A shows an optical lens system in accordance with a second embodiment of the present invention.
Figure 2B:
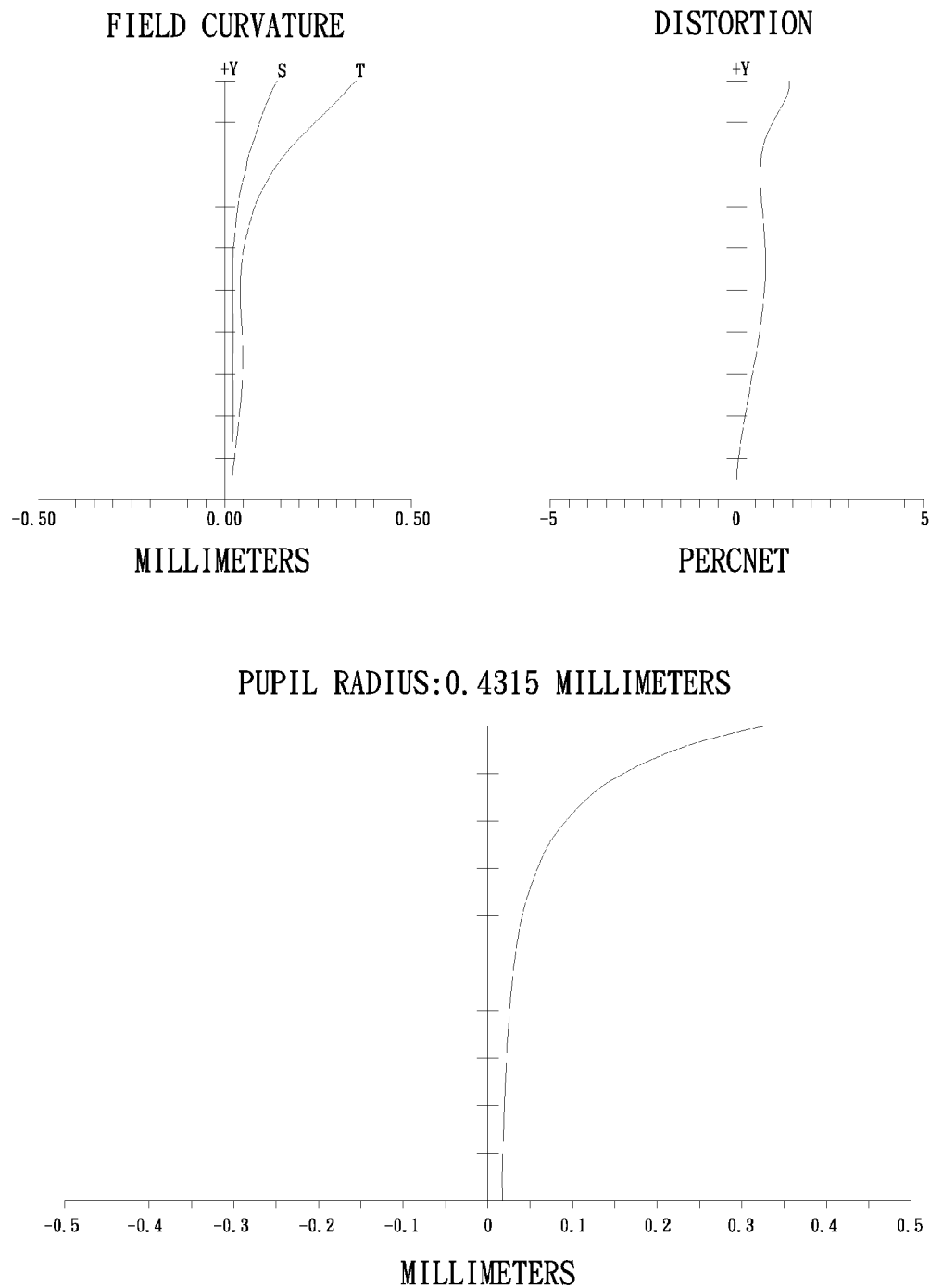
FIG. 2B shows the longitudinal spherical aberration curve, the astigmatic field curve, and the distortion curve of the second embodiment of the present invention.
Figure 3:
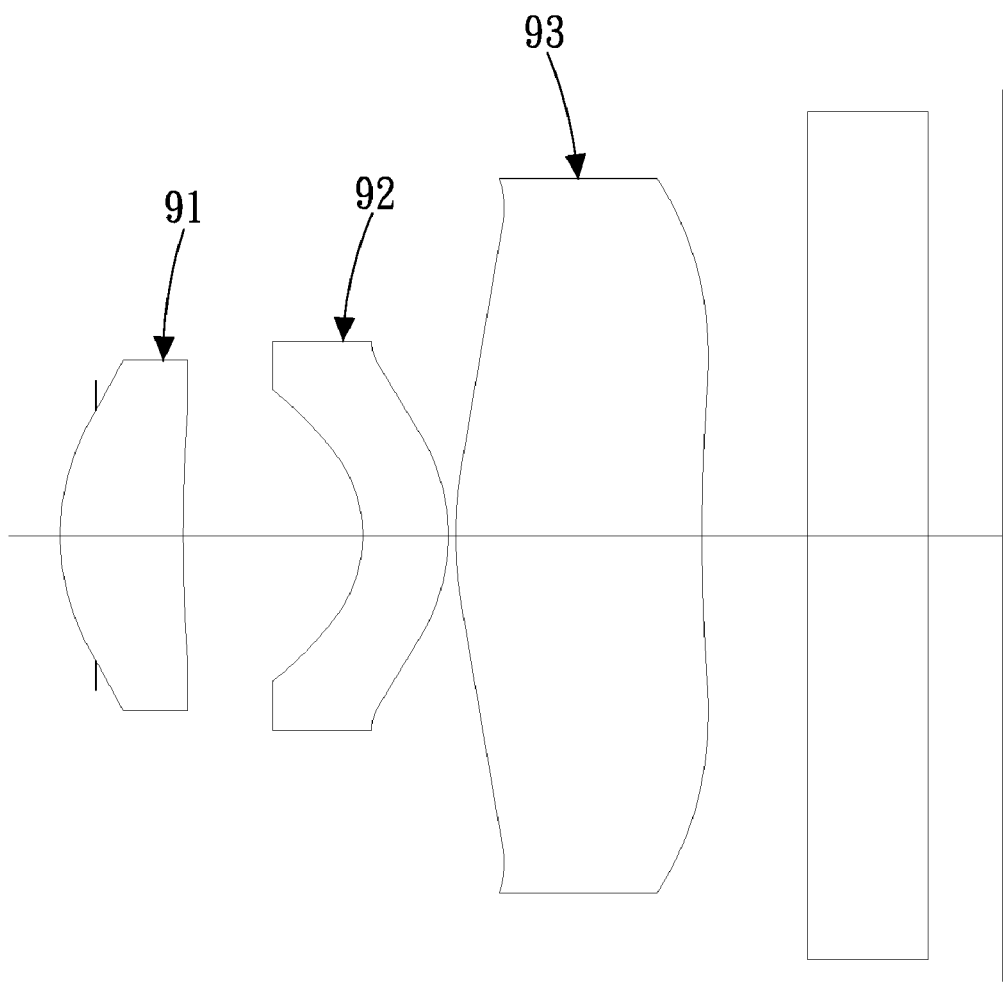
FIG. 3 shows a conventional optical lens system.

Referring to FIG. 2A, which shows an optical lens system in accordance with a second embodiment of the present invention, and FIG. 2B shows the longitudinal spherical aberration curves, the astigmatic field curves, and the distortion curve of the second embodiment of the present invention. The second embodiment of the present invention comprises, in order from the object side A to the image side B:

A first lens element 210 with a positive refractive power made of plastic has a convex object-side surface 211 and a concave image-side surface 212, and the object-side surface 211 and the image-side surface 212 of the first lens element 210 are aspheric.

A stop 220.

A second lens element 230 with a negative refractive power made of plastic has a concave object-side surface 231 and a convex image-side surface 232, and the object-side surface 231 and the image-side surface 232 of the second lens element 230 are aspheric.

A third lens element 240 with a positive refractive power made of plastic has a convex object-side surface 241 and a concave image-side surface 242, and the object-side surface 241 and the image-side surface 242 of the third lens element 240 are aspheric.

An IR cut filter 250 made of glass is located between the image-side surface 242 of the third lens element 240 and an image plane 260 and has no influence on the focal length of the optical lens system.

The equation for the aspheric surface profiles of the second embodiment is expressed as follows:

$$z = \frac{ch^2}{1 + [1 + (k+1)c^2h^2]^{0.5}} + Ah^4 + Bh^6 + Ch^8 + Dh^{10} + Eh^{12} + Gh^{14} + \ldots$$

wherein:

z represents the value of a reference position with respect to a vertex of the surface of a lens and a position with a height h along the optical axis 170 k represents the conic constant;

c represents the reciprocal of the radius of curvature;

A, B, C, D, E, G, . . . : represent the high-order aspheric coefficients.

In the second embodiment of the present optical lens system, the focal length of the optical lens system is f, and it satisfies the relation:

f=2.51.

In the second embodiment of the present optical lens system, the f-number of the optical lens system is Fno, and it satisfies the relation:

Fno=2.8.

In the second embodiment of the present optical lens system, the field of view of the optical lens system is 2ω, and it satisfies the relation:

2ω=69.

In the second embodiment of the present optical lens system, the focal length of the first lens element 210 is f1, the focal length of the second lens element 230 is f2, and they satisfy the relation:

|f1|/|f2|=0.716.

In the second embodiment of the present optical lens system, the focal length of the second lens element 230 is f2, the focal length of the third lens element 240 is f3, and they satisfy the relation:

|f2|/|f3|=0.89.

In the second embodiment of the present optical lens system, the focal length of the optical lens system is f, the focal length of the first lens element 210 and the second lens element 230 combined is f12, and they satisfy the relation:

|f12|/|f|=1.925.

In the second embodiment of the present optical lens system, the focal length of the optical lens system is f, the focal length of the second lens element 230 and the third lens element 240 combined is f23, and they satisfy the relation:

|f23|/|f|=55.288.

In the second embodiment of the present optical lens system, the focal length of the optical lens system is f, the distance between the object-side surface 211 of the first lens element 210 and the image plane 260 is TL, and they satisfy the relation:

|f|/|TL|=0.8.

The detailed optical data of the second embodiment is shown in table 3, and the aspheric surface data is shown in table 4, wherein the units of the radius of curvature, the thickness and the focal length are expressed in mm. In the tables 3 and 4, the surfaces 1 and 2 represent the object-side surface 211 and the image-side surface 212 of the first lens element 210, respectively, the surfaces 4 and 5 represent the object-side surface 231 and the image-side surface 232 of the second lens element 230, respectively, and the surfaces 6 and 7 represent the object-side surface 241 and the image-side surface 242 of the third lens element 240, respectively.

TABLE 3

(Embodiment 2)
f (focal length) = 2.51 mm, Fno = 2.8, 2ω = 69:

| Surface # | | Curvature Radius | Thickness | Material | nd | vd |
|---|---|---|---|---|---|---|
| 0 | Object | Infinity | Infinity | | | |
| 1 | Lens 1 | 0.804669 (ASP) | 0.489057 | Plastic | 1.535 | 56 |
| 2 | | 1.968962 (ASP) | 0.114793 | | | |
| 3 | Stop | Infinity | 0.270602 | | | |

TABLE 3-continued (Embodiment 2)
f (focal length) = 2.51 mm, Fno = 2.8, 2ω = 69:

| Surface # | | Curvature Radius | Thickness | Material | nd | vd |
|---|---|---|---|---|---|---|
| 4 | Lens 2 | −0.673 (ASP) | 0.3246 | Plastic | 1.632 | 23 |
| 5 | | −1.21451 (ASP) | 0.23358 | | | |
| 6 | | 1.190834 (ASP) | 0.751439 | Plastic | 1.535 | 56 |
| 7 | Lens 3 | 2.573349 (ASP) | 0.11 | | | |
| 8 | IR-filter | Infinity | 0.21 | Glass | 1.5168 | 64.167336 |
| 9 | | Infinity | 0.634696 | | | |
| 10 | Image | Infinity | | | | |

TABLE 4

Aspheric Coefficients

| Surface # | 1 | 2 | 4 | 5 | 6 | 7 |
|---|---|---|---|---|---|---|
| k = | −0.02980639 | 3.518053 | 2.02648 | 2.084079 | −13.5649 | 1.286384 |
| A = | 0.061269 | −0.05164 | −0.02568 | −0.97226 | −0.18337 | −0.2274 |
| B = | 0.469007 | −0.06852 | −0.58025 | 3.355579 | 0.182023 | 0.070731 |
| C = | −3.02649 | −3.51569 | 45.6459 | −7.32147 | −0.07214 | −0.02943 |
| D = | 9.606462 | −50.2179 | −325.166 | 9.251752 | 0.011727 | 0.012417 |
| E = | −13.7504 | 322.1578 | 1500.349 | 1.026458 | −0.00038 | −0.00248 |

TABLE 5

| | Embodiment 1 | Embodiment 2 |
|---|---|---|
| f | 2.5 | 2.51 |
| Fno | 2.8 | 2.8 |
| 2ω | 71 | 69 |
| |f1|/|f2| | 0.698 | 0.716 |
| |f2|/|f3| | 0.904 | 0.89 |
| f12|/|f| | 1.903 | 1.925 |
| |f23|/|f| | 39.871 | 55.288 |
| |f|/|TL| | 0.801 | 0.8 |

It is to be noted that the tables 1-4 show different data from the different embodiments, however, the data of the different embodiments is obtained from experiments. Therefore, any product of the same structure is deemed to be within the scope of the present invention even if it uses different data. Table 5 lists the relevant data for the various embodiments of the present invention.

In the present optical lens system, the lens elements can be made of glass or plastic. If the lens elements are made of glass, there is more freedom in distributing the refractive power of the optical lens system. If the lens elements are made of plastic, the cost will be effectively reduced.

In the present optical lens system, if the object-side or the image-side surface of the lens elements is convex, the object-side or the image-side surface of the lens elements in proximity of the optical axis is convex. If the object-side or the image-side surface of the lens elements is concave, the object-side or the image-side surface of the lens elements in proximity of the optical axis is concave.

While we have shown and described various embodiments in accordance with the present invention, it should be clear to those skilled in the art that further embodiments may be made without departing from the scope of the present invention.

What is claimed is:

1. An optical lens system comprising, in order from an object side to an image side:
   a first lens element with a positive refractive power having a convex object-side surface, at least one of the object-side and an image-side surfaces of the first lens element being aspheric;
   a stop;
   a second lens element with a negative refractive power having a concave object-side surface, at least one of the object-side and an image-side surfaces of the second lens element being aspheric;
   a third lens element with a positive refractive power having a concave image-side surface, at least one of an object-side and the image-side surfaces of the third lens element being aspheric;
   wherein a focal length of the first lens element is f1, a focal length of the second lens element is f2, and they satisfy the relations:

$0.4 < |f1|/|f2| < 1.0;$ $0.5 < |f2|/|f3| < 1.3.$

2. The optical lens system as claimed in claim 1, wherein a focal length of the optical lens system is f, a focal length of the first lens element and the second lens element combined is f12, and they satisfy the relation:

$1.3 < |f12|/|f| < 2.5.$

3. The optical lens system as claimed in claim 1, wherein a focal length of the optical lens system is f, a focal length of the second lens element and the third lens element combined is f23, and they satisfy the relation:

$25 < |f23|/|f| < 70.$

4. The optical lens system as claimed in claim 1, wherein a focal length of the optical lens system is f, a distance between the object-side surface of the first lens element and an image plane is TL, and they satisfy the relation:

$0.6 < |f|/|TL| < 1.0.$

5. The optical lens system as claimed in claim 1, wherein the first lens element is made of plastic, the image-side surface of the first lens element is convex, and the object-side surface and the image-side surface of the first lens element are aspheric.

6. The optical lens system as claimed in claim 1, wherein the second lens element is made of plastic, the image-side surface of the second lens element is convex, and the object-side surface and the image-side surface of the second lens element are aspheric.

7. The optical lens system as claimed in claim 1, wherein the third lens element is made of plastic, the object-side surface of the third lens element is convex, and the object-side surface and the image-side surface of the third lens element are aspheric.

* * * * *